United States Patent
Tkach et al.

(10) Patent No.: US 10,831,856 B1
(45) Date of Patent: Nov. 10, 2020

(54) SYSTEM, METHOD, AND COMPUTER PROGRAM FOR IMPLEMENTING TRUSTABLE, UNOBTRUSIVE WEBPAGE MONITORING AND CORRECTING BASED ON VALIDATION RULES

(71) Applicant: Amdocs Development Limited, Limassol (CY)

(72) Inventors: Vladimir Tkach, Kfar Yona (IL); Maxim Paliy, Netanya (IL); Yuri Kroz, Vancouver (CA)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 26 days.

(21) Appl. No.: 15/950,101

(22) Filed: Apr. 10, 2018

(51) Int. Cl.
*G06F 17/00* (2019.01)
*G06F 16/958* (2019.01)
*G06F 40/103* (2020.01)
*G06F 40/166* (2020.01)

(52) U.S. Cl.
CPC .......... *G06F 16/958* (2019.01); *G06F 40/103* (2020.01); *G06F 40/166* (2020.01)

(58) Field of Classification Search
CPC ........................... G06F 17/2725; G06F 16/958
See application file for complete search history.

(56) References Cited

U.S. PATENT DOCUMENTS

| | | | |
|---|---|---|---|
| 7,657,832 B1* | 2/2010 | Lin | G06F 17/2247 715/234 |
| 8,589,790 B2 | 11/2013 | Seolas et al. | |
| 9,917,908 B1* | 3/2018 | Knecht | H04L 67/20 |
| 2001/0044820 A1 | 11/2001 | Scott | |
| 2009/0300709 A1* | 12/2009 | Chen | G06F 17/30893 726/1 |
| 2014/0317754 A1 | 10/2014 | Niemela et al. | |
| 2015/0052402 A1* | 2/2015 | Gurumurthy | G06F 11/3688 714/38.1 |
| 2016/0226900 A1* | 8/2016 | Fajardo Verano | G06F 21/55 |

FOREIGN PATENT DOCUMENTS

| | | |
|---|---|---|
| CN | 104199962 A | 12/2014 |
| EP | 3113064 B1 | 11/2017 |
| WO | 2013168902 A1 | 11/2013 |
| WO | 2016164036 A1 | 10/2016 |

* cited by examiner

*Primary Examiner* — Andrew T McIntosh
(74) *Attorney, Agent, or Firm* — Zilka-Kotab, P.C.

(57) ABSTRACT

A system, method, and computer program product are provided for implementing trustable, unobtrusive webpage monitoring and correcting based on validation rules. In operation, a system determines that a webpage has finished rendering. The system detects changes made to a webpage. The system determines whether the changes made to the webpage are valid changes based on one or more rules. The system computes correcting actions for the changes made to the webpage if it is determined that the changes made to the webpage are not valid changes based on the one or more rules. Further, the system implements the correcting actions to the webpage.

9 Claims, 6 Drawing Sheets

Validation rules:

iframe: "remove"

input [type="password"]: "reload"

DOMAttribute: "reload"

CSSAttribute: "ignore"

SYSTEM, METHOD, AND COMPUTER PROGRAM FOR IMPLEMENTING TRUSTABLE, UNOBTRUSIVE WEBPAGE MONITORING AND CORRECTING BASED ON VALIDATION RULES

FIELD OF THE INVENTION

The present invention relates to webpage monitoring, and more particularly to implementing trustable, unobtrusive webpage monitoring and correcting based on validation rules.

BACKGROUND

An enterprise company strives to ensure a consistent displaying and functionality of any corporate webpage (e.g. web portal, product page, login page, etc.), while preventing any third party changes that might be made to the webpage. This is important since a company's webpage is its face to the world. Thus, any third party interference with the original webpage structure/functionality might break the company's reputation in the eyes of potential customers. Additionally, certain structural changes may lead to potential security issues. For example, changes to a login input field type from password to text, or original image replacement with fake images, etc., would be problematic for a company.

This third party interference usually comes from Trojan horses, viruses, manual customization via debug tools, and/or web-browser plugins, etc. Current systems fail to provide security from these threats in an unobtrusive manner.

There is thus a need for addressing these and/or other issues associated with the prior art.

SUMMARY

A system, method, and computer program product are provided for implementing trustable, unobtrusive webpage monitoring and correcting based on validation rules. In operation, a system determines that a webpage has finished rendering. The system detects changes made to a webpage. The system determines whether the changes made to the webpage are valid changes based on one or more rules. The system computes correcting actions for the changes made to the webpage if it is determined that the changes made to the webpage are not valid changes based on the one or more rules. Further, the system implements the correcting actions to the webpage.

DETAILED DESCRIPTION

Figure 1:
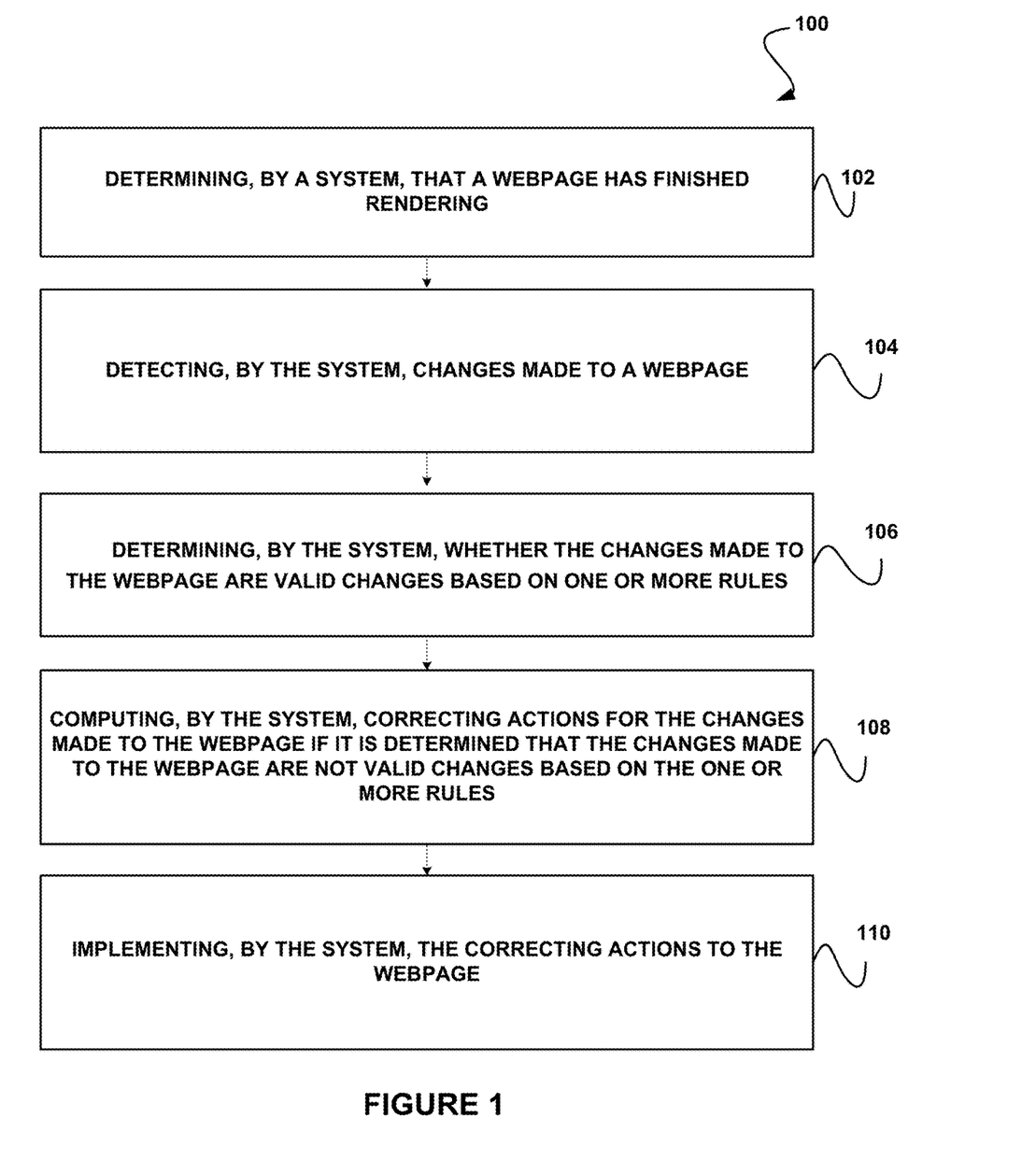
FIG. 1 illustrates a method for implementing trustable, unobtrusive webpage monitoring and correcting based on validation rules, in accordance with one embodiment.

FIG. 1 illustrates a method 100 for implementing trustable, unobtrusive webpage monitoring and correcting based on validation rules, in accordance with one embodiment.

In operation, a system determines that a webpage (e.g. a web portal, a product page, a login page, etc.) has finished rendering. See operation 102. The webpage may be being rendered on another system (e.g. a client system, etc.) or on the system itself.

Further, the system detects changes made to a webpage. See operation 104. In one embodiment, a client script on the system may determine that changes have been made and the send a notification (e.g. including change details, etc.) to the system.

The system determines whether the changes made to the webpage are valid changes based on one or more rules. See operation 106. In one embodiment, the rules may be rules that are generated by a webmaster associated with the webpage. In this case, the rules may be stored in a database accessible by the system.

The system computes correcting actions for the changes made to the webpage if it is determined that the changes made to the webpage are not valid changes based on the one or more rules. See operation 108. The correcting actions may include any actions or steps to correct the invalid changes. In one embodiment, computing the correcting actions for the changes made to the webpage may include generating a list of changes to implement.

Further, the system implements the correcting actions to the webpage. See operation 110. In various embodiments, implementing the correcting actions to the webpage may include removing the changes made to the webpage, updating the webpage, and/or ignoring the changes made to the webpage, etc.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
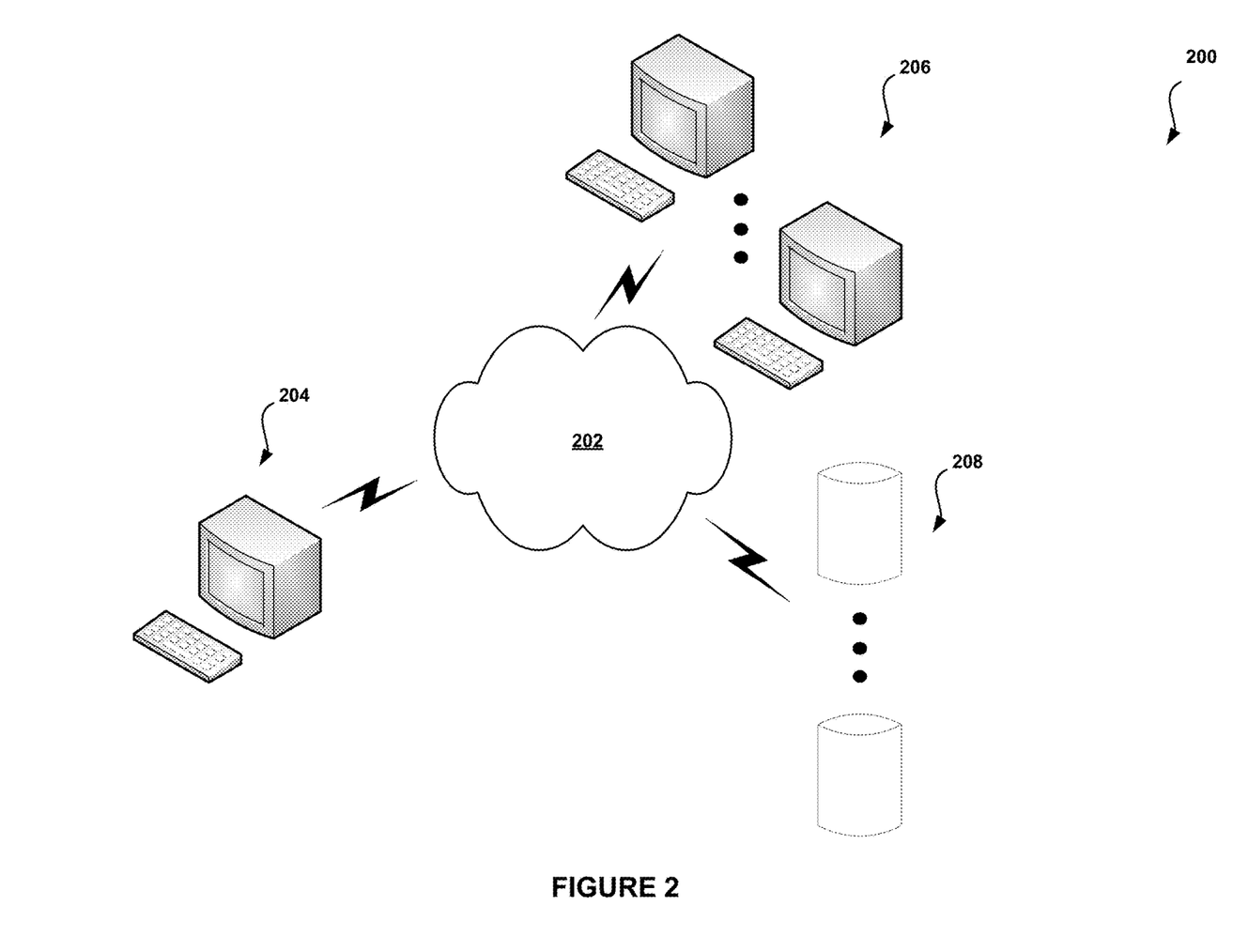
FIG. 2 shows a system for implementing trustable, unobtrusive webpage monitoring and correcting based on validation rules, in accordance with one embodiment.

FIG. 2 shows a system 200 for implementing trustable, unobtrusive webpage monitoring and correcting based on validation rules, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems 206, either directly or over one or more networks 202, for implementing trustable, unobtrusive webpage monitoring and correcting based on validation rules. The system 204 may also be in communication with one or more repositories/databases 208. It should be noted that the system 204 and the systems 206 may represent any type of computing device, such as computers, mobile phones, tablets, and/or any other device capable of performing computations. Moreover, the system 204 and the systems 206 may be in the same location or across various geographical locations (e.g. different countries, etc.).

An enterprise company strives to ensure a consistent displaying and functionality of any corporate webpage (e.g. web portal, product page, login page, etc.), while preventing any third party changes that might be made to the webpage. This is important since a company's webpage is its face to the world. Thus, any third party interference with the original webpage structure/functionality might damage the company's reputation in the eyes of its potential customers. Additionally, certain structural changes may lead to potential security issues. For example, changes to a login input field type from password to text, or original image replacement with fake images, etc., would be problematic for a company.

This third party interference usually comes from Trojan horses, viruses, manual customization via debug tools, and/or web-browser plugins, etc.

The system 204 solves these problems by providing a parallel unobtrusive webpage validation and auto-correcting layer. The layer ensures a correct and consistent displaying and functionality of a current webpage.

A company's webmaster builds a list of rules that regulate policy of changes and behavior of a webpage's elements. The rules may be stored in a trusted repository in such a format as JSON, YAML, XML, etc.

The systems rending the web pages, for example, the systems 206, run a usual script that is a part of a webpage. The systems 206 do not require any additional installations.

In operation, a website visitor submits a company's webpage request to a webserver via a browser. The webserver invokes webpage rendering engine. The rendering engine renders the request webpage (e.g. on one of the systems 206, etc.), passes the initial webpage state to a validation engine (e.g. running on the system 204, etc.) and returns the rendered webpage to the browser. A browser (e.g. on one of the systems 206, etc.) then renders and presents the page to the website's visitor.

The script implemented by the system 204 waits for the webpage to finish rendering (e.g. onDOMReady event), initializes a "webpage changes" collector and starts a changes sender. The collector listens to a particular DOM/DOMAttribute/CSS, etc., changes, and collects them.

The running changes sender periodically (e.g. by a certain timestamp, etc.) gets changes from the collector. In the case there are changes in place, the changes sender sends the list of changes to a validation and correcting engine of the system 204. The validation and correcting engine validates the changes that occurred to the webpage against the rules set by a company's webmaster.

In the case that invalid changes were made to a webpage, the validation and correcting engine computes a correcting actions list to be taken and transmits the list as a response to the changes sender. The changes sender receives the correcting actions to be taken, and if there are correcting actions, invokes a webpage corrector of the system 204. The webpage corrector corrects the webpage with removing/update/ignore actions.

It should be noted that although the webpage changes collector, the changes sender, the validation and correcting engine, and the webpage corrector are described as parts of the system 204, in various embodiments, one or more of such subsystems may be part of another system and/or a standalone system.

Figure 3:
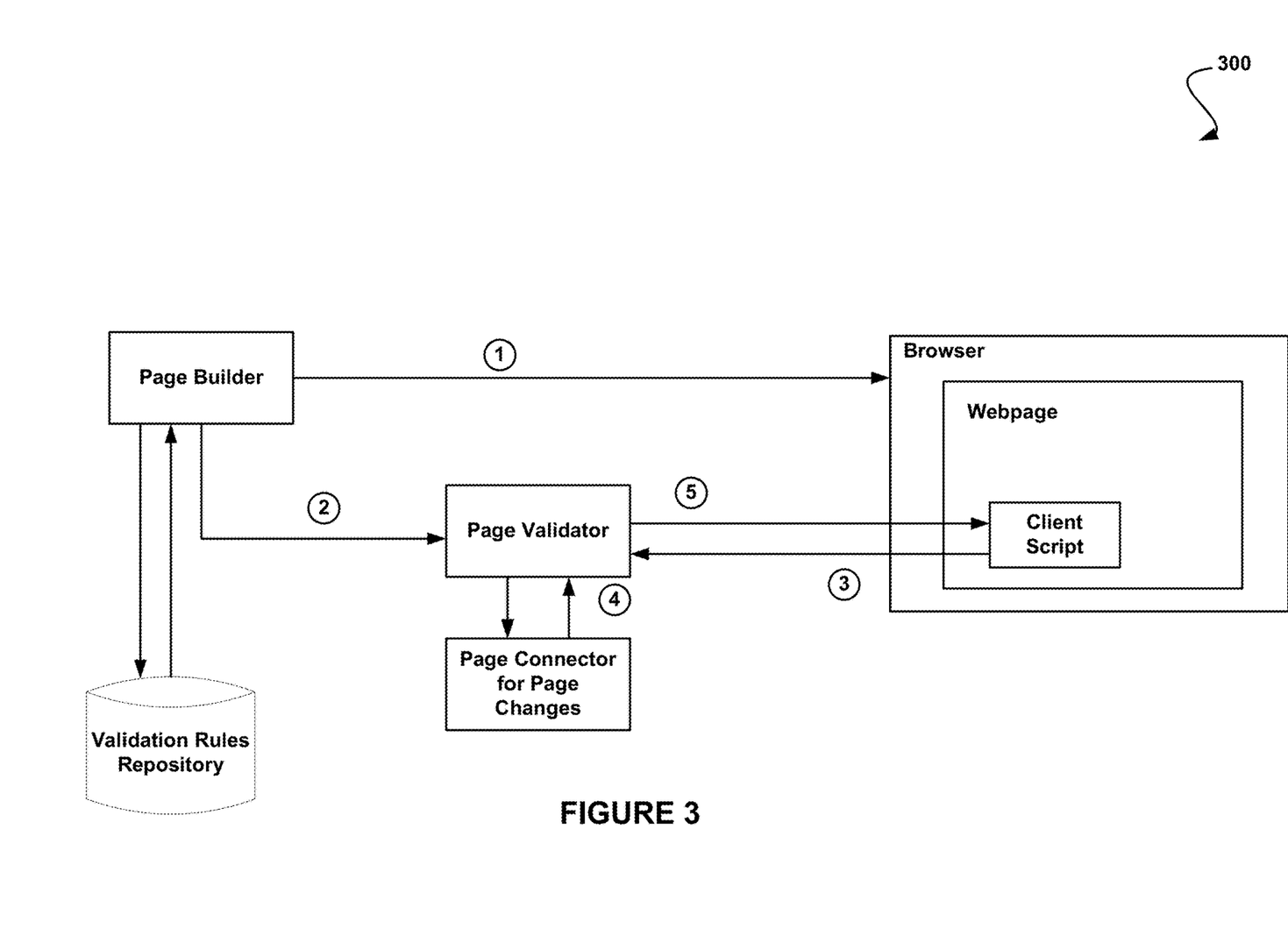
FIG. 3 shows a system flow diagram for trustable, unobtrusive webpage monitoring and correcting based on validation rules, in accordance with one embodiment.

FIG. 3 shows a system flow diagram 300 for implementing trustable, unobtrusive webpage monitoring and correcting based on validation rules, in accordance with one embodiment. As an option, the system flow diagram 300 may be implemented in the context of the details of the previous figures and/or any subsequent figure(s). Of course, however, the system flow diagram 300 may be implemented in the context of any desired environment. Further, the aforementioned definitions may equally apply to the description below.

As shown, an initial webpage is sent to a requesting machine including a browser (see step 1). The page ID and validation rules (e.g. obtained from a validations rules repository, etc.) are sent to a page validator (see step 2).

When changes are initiated to a web page, a client script sends information associated with the changes (e.g. a page ID, hash HTML, page changes, etc.) to the page validator (see step 3). The page validator determines whether the changes are valid, based on the validation rules, and if they are not, requests correction data from a page corrector (see step 4). In this case, the page validator sends a list of corrections to apply to the client script (see step 5). It should be noted that the page validator, the page corrector, and the client script may be considered part of the same system and/or different systems.

Figure 4:
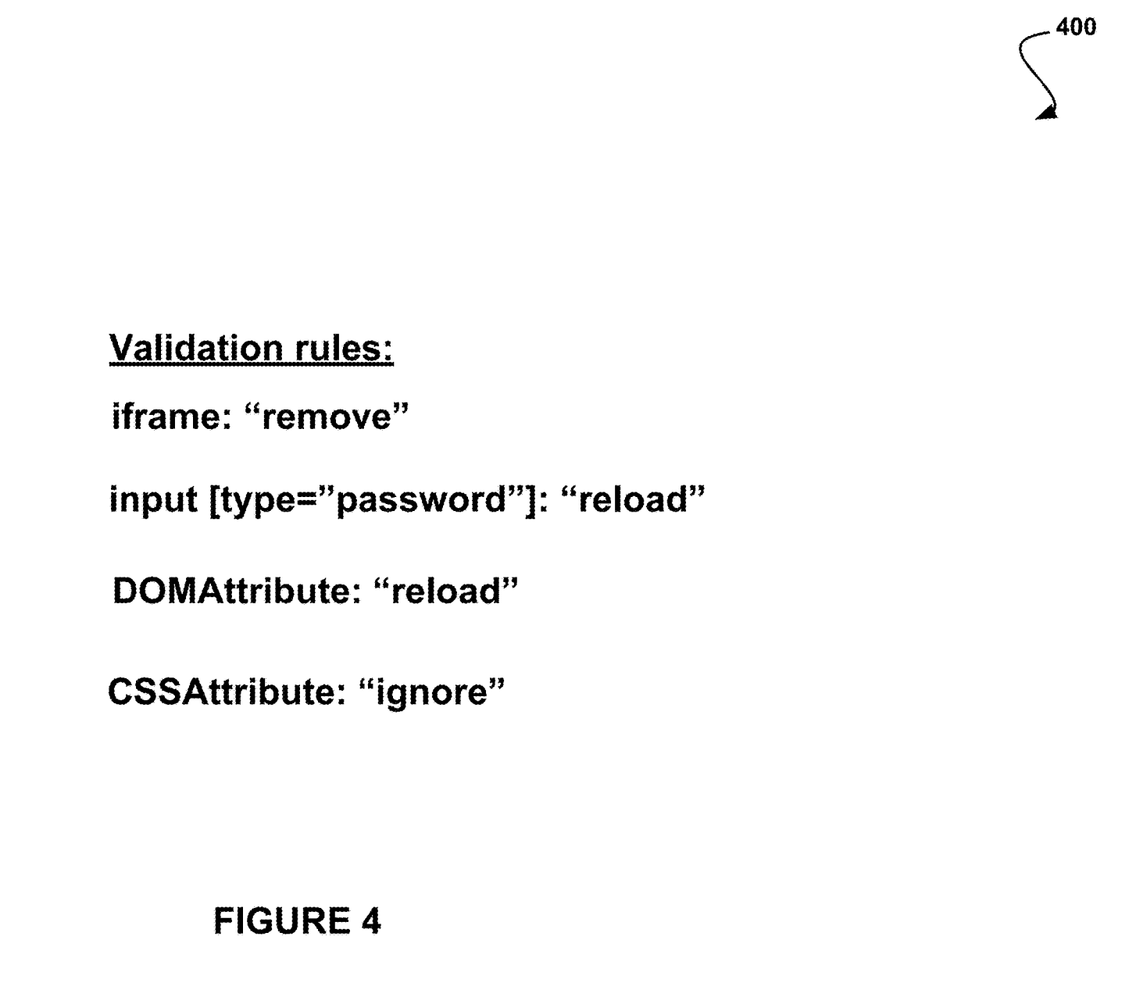
FIG. 4 shows an example of validation rules, in accordance with one embodiment.

FIG. 4 shows an example 400 of validation rules, in accordance with one embodiment. As an option, the example 400 may be implemented in the context of the details of the previous figures and/or any subsequent figure(s). Of course, however, the example 400 may be implemented in the context of any desired environment. Further, the aforementioned definitions may equally apply to the description below.

As shown, the validation rules may include actions to take if a particular parameter associated with a web page is changed. Of course, this is only an example. Any type of rule may be established by a webmaster.

Figure 5:
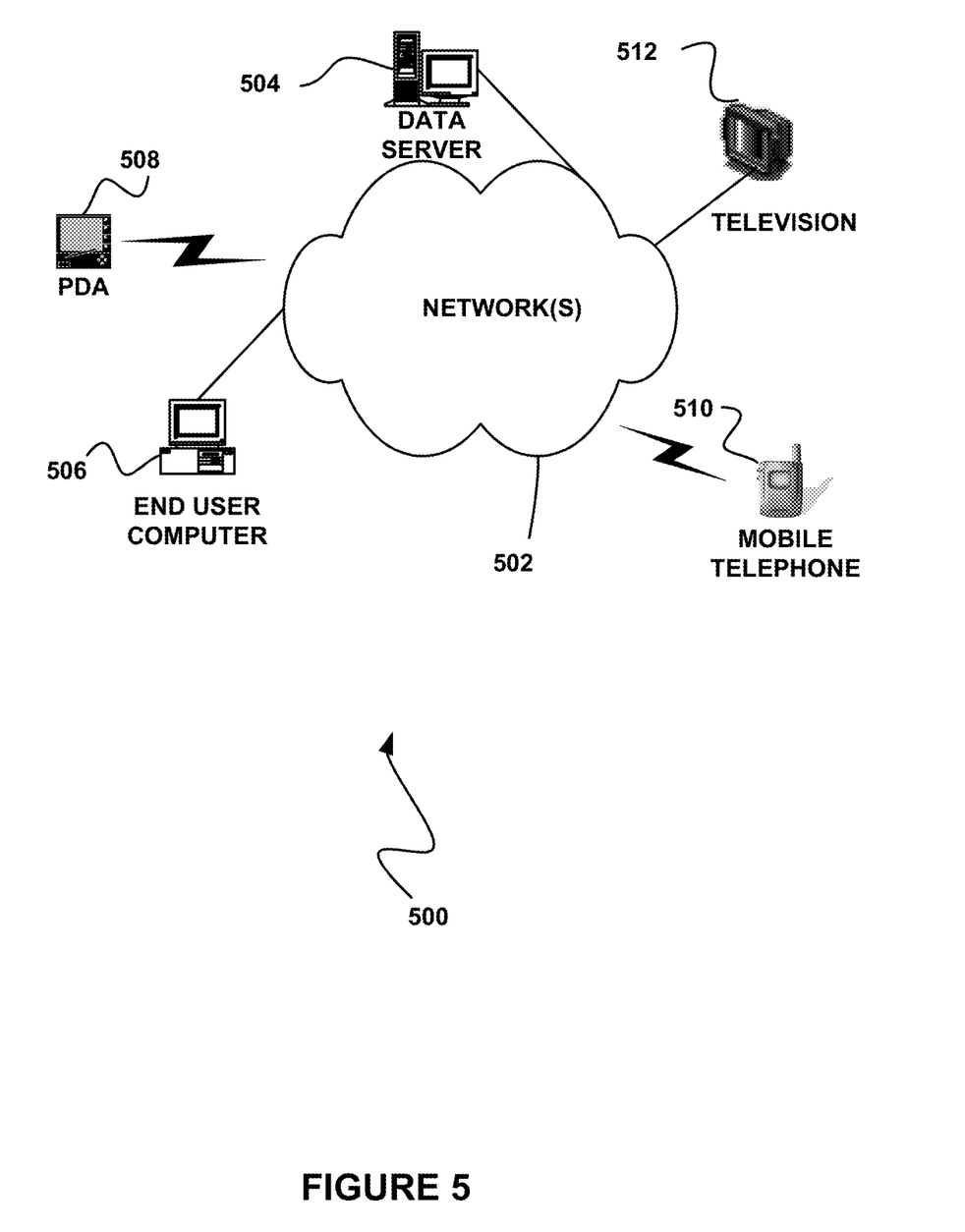
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
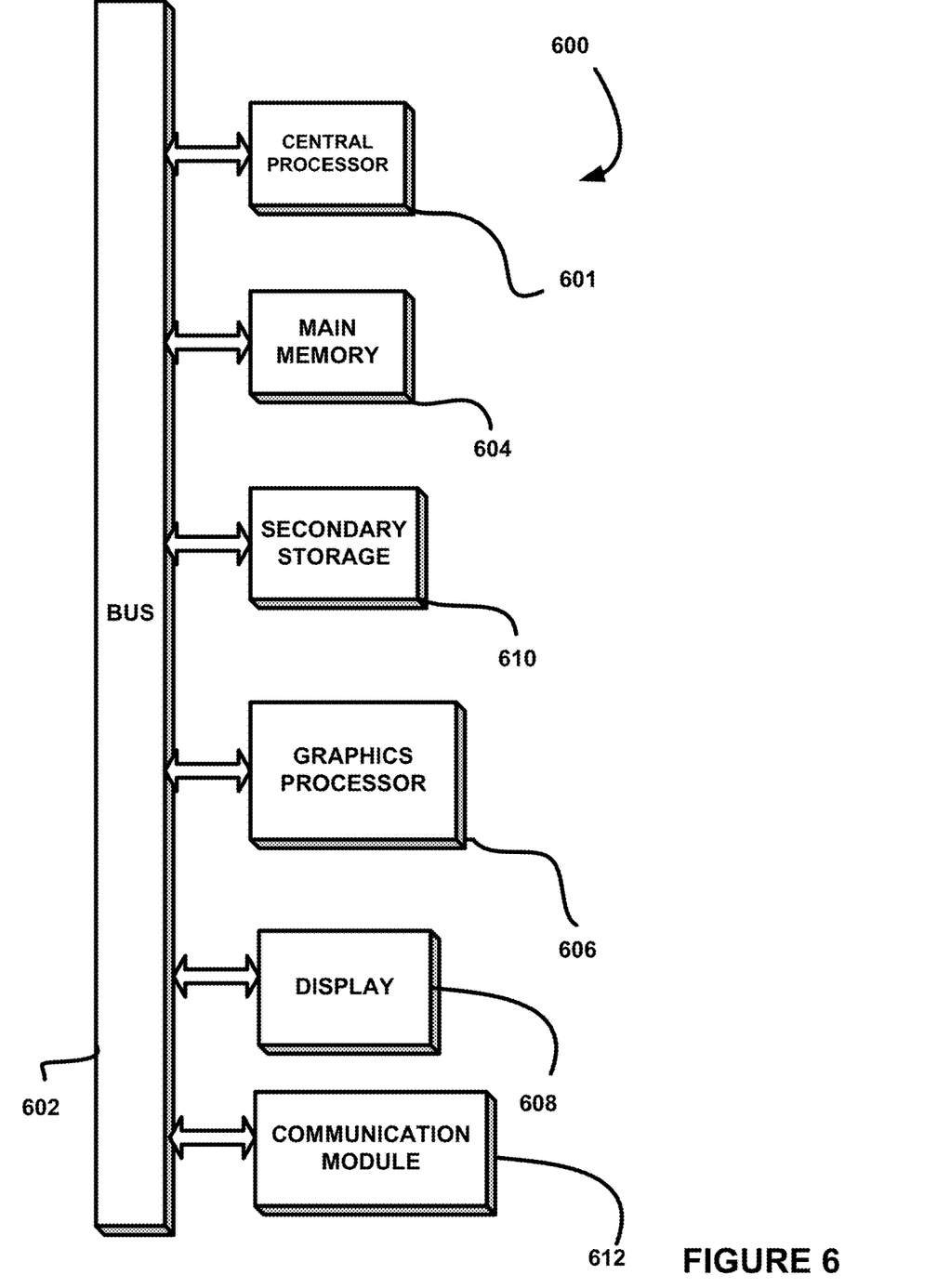
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, by a validation and correcting engine of a system from a webpage rendering engine invoked by a webserver to provide a rendered webpage to a client-side system, an initial webpage state for the rendered webpage, wherein the webpage is provided by a company, and wherein the system is in communication with the client-side system via a network;
   receiving, by the validation and correcting engine of the system over a network from a script running as part of the rendered webpage on the client-side system, an indication of one or more changes made to the rendered webpage;
   accessing, by the validation and correcting engine of the system, a repository storing a plurality of rules built by the company that regulate policy of changes and behavior of elements of the webpage;
   validating, by the validation and correcting engine of the system, the one or more changes against the rules;
   determining, by the validation and correcting engine of the system as a result of the validating, that at least one of the one or more changes made to the webpage are invalid changes made by a third party separate from the company;
   computing, by the validation and correcting engine of the system, correcting actions for the at least one of the one or more changes made to the webpage that are determined to be invalid changes, the correcting actions correcting the invalid changes wherein the rules include the correcting actions to take when a particular parameter associated with the web page is changed; and
   causing, by the validation and correcting engine of the system, the script running as part of the rendered webpage on the client-side system to implement the correcting actions to the rendered webpage to correct the invalid changes, the correcting actions including, at least in part, removing the at least one of the one or more changes made to the webpage that are determined to be invalid changes, the causing performed by:
   generating a list of the correcting actions to be taken, and
   transmitting the list to the script running as part of the rendered webpage on the client-side system to implement the correcting actions included in the list.

2. The method of claim 1, wherein the correcting actions further include updating the rendered webpage.

3. The method of claim 1, wherein the plurality of rules are generated by a webmaster associated with the webpage.

4. A computer program product embodied on a non-transitory computer readable medium, comprising computer code for:
   receiving, by a validation and correcting engine of a system from a webpage rendering engine invoked by a webserver to provide a rendered webpage to a client-side system, an initial webpage state for the rendered webpage, wherein the webpage is provided by a company, and wherein the system is in communication with the client-side system via a network;
   receiving, by the validation and correcting engine of the system over a network from a script running as part of the rendered webpage on the client-side system, an indication of one or more changes made to the rendered webpage;
   accessing, by the validation and correcting engine of the system, a repository storing a plurality of rules built by the company that regulate policy of changes and behavior of elements of the webpage;
   validating, by the validation and correcting engine of the system, the one or more changes against the rules;
   determining, by the validation and correcting engine of the system as a result of the validating, that at least one of the one or more changes made to the webpage are invalid changes made by a third party separate from the company;
   computing, by the validation and correcting engine of the system, correcting actions for the at least one of the one or more changes made to the webpage that are determined to be invalid changes, the correcting actions correcting the invalid changes, wherein the rules include the correcting actions to take when a particular parameter associated with the web page is changed; and
   causing, by the validation and correcting engine of the system, the script running as part of the rendered webpage on the client-side system to implement the correcting actions to the rendered webpage to correct the invalid changes, the correcting actions including, at least in part, removing the at least one of the one or more changes made to the webpage that are determined to be invalid changes, the causing performed by:
   generating a list of the correcting actions to be taken, and
   transmitting the list to the script running as part of the rendered webpage on the client-side system to implement the correcting actions included in the list.

5. The computer program product of claim 4, wherein the correcting actions further include updating the rendered webpage.

6. The computer program product of claim 4, wherein the plurality of rules are generated by a webmaster associated with the webpage.

7. A system, comprising one or more processors, operable for:
   receiving, by a validation and correcting engine of the system from a webpage rendering engine invoked by a webserver to provide a rendered webpage to a client-side system, an initial webpage state for the rendered webpage, wherein the webpage is provided by a company, and wherein the system is in communication with the client-side system via a network;
   receiving, by the validation and correcting engine of the system over a network from a script running as part of the rendered webpage on the client-side system, an indication of one or more changes made to the rendered webpage;
   accessing, by the validation and correcting engine of the system, a repository storing a plurality of rules built by the company that regulate policy of changes and behavior of elements of the webpage;

validating, by the validation and correcting engine of the system, the one or more changes against the rules;

determining, by the validation and correcting engine of the system as a result of the validating, that at least one of the one or more changes made to the webpage are invalid changes made by a third party separate from the company;

computing, by the validation and correcting engine of the system, correcting actions for the at least one of the one or more changes made to the webpage that are determined to be invalid changes, the correcting actions correcting the invalid changes, wherein the rules include the correcting actions to take when a particular parameter associated with the web page is changed; and causing, by the validation and correcting engine of the system, the script running as part of the rendered webpage on the client-side system to implement the correcting actions to the rendered webpage to correct the invalid changes, the correcting actions including, at least in part, removing the at least one of the one or more changes made to the webpage that are determined to be invalid changes, the causing performed by:

generating a list of the correcting actions to be taken, and transmitting the list to the script running as part of the rendered webpage on the client-side system to implement the correcting actions included in the list.

8. The system of claim 7, wherein the correcting actions further include updating the rendered webpage.

9. The system of claim 7, wherein the plurality of rules are generated by a webmaster associated with the webpage to regulate policy of changes and behavior of elements of the webpage.

\* \* \* \* \*